United States Patent [19]

Stuck

[11] 3,801,395
[45] Apr. 2, 1974

[54] BALL JOINT FRICTION WELDING METHOD

[76] Inventor: Klaus Stuck, 4005 Buderick Dorfstabe 29, Buderich, Germany

[22] Filed: Dec. 29, 1971

[21] Appl. No.: 213,575

Related U.S. Application Data

[62] Division of Ser. No. 74,324, Sept. 22, 1970, Pat. No. 3,695,650.

[52] U.S. Cl. .................. 156/73, 29/470.3, 228/2, 287/88, 308/196
[51] Int. Cl. ............................. B29c 27/08
[58] Field of Search ......... 228/2; 29/470.3; 156/73; 287/88, 189, 36 B; 308/72, 196

[56] References Cited
UNITED STATES PATENTS

| | | | |
|---|---|---|---|
| 2,906,569 | 9/1959 | Runton et al. | 308/72 |
| 3,343,895 | 9/1967 | Morrison | 308/196 |
| 3,576,068 | 4/1971 | Justice et al. | 29/470.3 |
| 3,470,720 | 10/1969 | Eklund et al. | 72/69 |
| 3,452,415 | 7/1969 | Beagley et al. | 287/88 X |
| 3,002,870 | 10/1961 | Belgarde et al. | 156/73 X |
| 2,956,611 | 10/1960 | Jendrisak et al. | 156/73 |

*Primary Examiner*—J. Spencer Overholser
*Assistant Examiner*—Robert J. Craig
*Attorney, Agent, or Firm*—Arthur Schwartz

[57] ABSTRACT

A ball joint having a ball element surrounded by a pair of ball cups of plastic material which are friction welded along the equator of the ball element and having a sleeve surrounding the ball cups.

1 Claim, 2 Drawing Figures

BALL JOINT FRICTION WELDING METHOD

This is a division of application Ser. No. 74,324 filed Sept. 22, 1970, now U.S. Pat. No. 3,695,650.

BACKGROUND OF THE INVENTION

1. Field of the Invention

The invention relates to ball joints, and in particular to ball joints for omni-directional motion attachments such as the attachment of shock absorbers or of tie rods in motor vehicles.

2. Description of the Prior Art

Shock absorbers of the type which are to be attached by means of a ball joint according to the invention, for example, have the shape of a cylindrical tube with one end thereof closed. They include a movable piston inside the tube which is attached to a piston rod extending from the other end of the tube. The closed end of the tube is attached to one part of the vehicle in question, and the free end of the piston rod is attached to another part of the vehicle. Known attachments consist of an attachment eye on each of the attachment points of the shock absorbers and a matching forked yoke on each of the corresponding vehicle parts. The eye and yoke are traversed by a connecting pin. Between the inner wall of the eye and the connecting pin is normally arranged a rubber sleeve so as to produce a resilient rubber lock mount. Such a resilient mount offers very little yield in the radial direction. It, therefore, produces a relatively great resistance force, when the shock absorber axis deviates from its perpendicular alignment with the connecting pin—which occurs when the vehicle is driven. This resistance force is detrimental to the desired operation of the shock absorber, as it creates lateral forces between the piston and cylinder of the shock absorber. Furthermore, the stresses created in the rubber through such deviations from the alignment position result in irregular radial deformation of the rubber, thus causing its premature destruction. A satisfactory yield, though under resistance, is obtainable only in the direction of the axis of the connecting pin.

SUMMARY OF THE INVENTION

The basic objective underlying the present invention is the provision of a ball joint attachment allowing omni-directional motion. The joint is preferably yieldable, as well as easily movable, its production being simple and requiring a minimum of material.

According to the invention, this objective is attained by a ball joint attachment, where the ball element for attachment to one part is arranged between ball cups or ball sockets of weldable and preferably resilient plastic material. The ball cups are surrounded by a cylindrical sleeve which is part of or to be attached to the other part. The end faces abut against one another by having the end faces positioned in the plane of the ball equator or in a plane parallel thereto. The abutting end faces of the ball cups are bounded to one another by a friction weld.

The ball joint thus obtained is of a very simple construction, permitting an attachment for omni-directional motion with a minimum of parts required and without necessitating close manufacturing tolerances. In addition, the ball joint forms a self-contained block and its assembly into a block requires no complicated operations.

In order to assemble the ball joint as suggested by the invention, it is sufficient to introduce the ball element, together with the ball cups surrounding it, into the cylindrical sleeve and to rotate the ball cups relative to one another, while creating sufficient frictional speed and pressure between them, thereby heating their end faces to the welding temperature. As soon as the welding temperature is reached, the rotation is preferably immediately stopped. After a brief cooling period, the drive and compression tools are retracted. To the surface of the ball element may be applied a lubricant, such as graphite. The same can be done with the inner surface of the cylindrical sleeve.

The ball element of the joint preferably includes hollow trunnion extensions on opposite sides and a central bore through the ball part and trunnions whose axis coincides with the axis of the cylindrical sleeve. The central bore and hollow trunnions may serve to accomodate a connecting pin. It is likewise possible to attach the ball element directly at its trunnions. In addition, these trunnions serve to maintain the axial alignment of the ball element during the assembly of the ball cups by friction welding, the trunnions engaging guide bores in the drive and compression tools, while the later engage the ball cups.

BRIEF DESCRIPTION OF THE DRAWING

In the accompanying drawing is illustrated, by way of an example, an embodiment of the invention as used for the attachment of shock absorbers, represented in the various figures as follows.

DESCRIPTION OF THE PREFERRED EMBODIMENT

Figure 1:
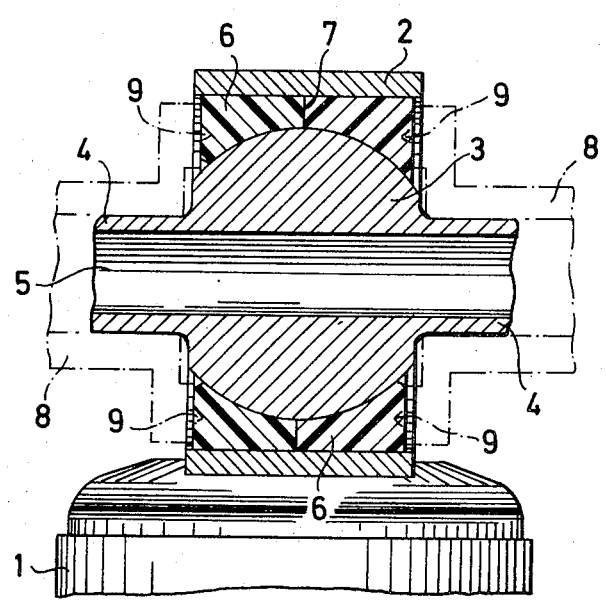
FIG. 1 shows in a longitudinal cross-section a ball joint embodying the invention, as attached to the end of a shock absorber.
Figure 2:
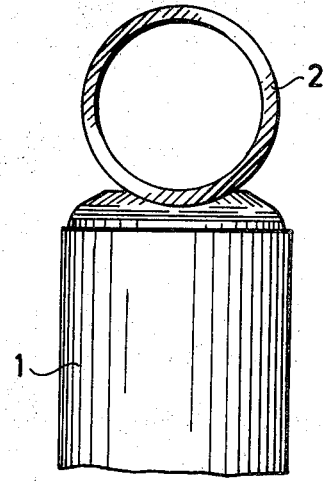
FIG. 2 shows in an elevated side view the attachment end of the shock absorber of FIG. 1 with portions of the ball joint itself removed.

The drawing and the accompanying description are limited to those parts which are necessary for a full understanding of the invention. Of the telescopic shock absorber designated by 1, only the one end is shown in FIGS. 1 and 2. The attachment ball joint for the other end of the shock absorber, i.e. for the free end of the piston rod, is of corresponding construction.

To the extremity of the shock absorber 1 is attached a cylindrical sleeve 2, which may also be inserted, after assembly of the ball joint, into a suitable eye bore provided at the end of the shock absorber. At the inside of the cylindrical sleeve 2 is arranged a ball element 3 which has two lateral trunnions 4. Through the ball portion and trunnions extends a central bore 5, the axis of which coincides with the axis of the sleeve 2, and which may accommodate a connecting pin (not shown in the drawing). The ball element 3 is supported by the hollow spherical surfaces of two ball cups 6. The latter are made of a weldable plastic material. The two ball cups 6 abut against one another in a plane 7 which is perpendicular to the bore axis and which coincides with the ball equator. The ball cups are bonded together in this plane 7 by a friction weld. In order to attach the shock absorber, the cylindrical sleeve 2 with the ball element 3 mounted therein is placed between the brackets of a forked yoke, and the connecting pin is inserted across the ball joint and the yoke. The lateral trunnions 4 assure that a proper distance is maintained between the brackets of the yoke and the end of the cylindrical sleeve 2, so as to permit angular motion or pivoting motion of the shock absorber.

It is also possible to caulk the cylindrical sleeve 2 after the assembly of the ball joint, or to add retaining rings or the like in the end portions of the sleeve, so as to prevent axial shifting of the ball element 3 and ball cups 6.

The friction welding operation may be performed in such a way, for example, that rotary tools 8 are positioned over the trunnions 4 of the ball element 3, the tools having in their end faces claws 9 or similar means which serve to drive the ball cups 6. The trunnions 4 are guided inside the drive tools. The two ball cups 6 are pressed against one another by applying axial pressure to the drive tools. By rotating the tools and cups 6 in opposite directions, frictional heat is created between the abutting faces at 7 of the ball cups, until the welding temperature is reached. When this welding temperature is reached, the drive and compression tools are immediately stopped and, following a brief cooling period, the tools are retracted.

I claim:

1. A method of fabricating a ball joint comprising the steps of:
    a. placing a pair of ball cups of plastic material around a ball element,
    b. placing said cups within a sleeve member,
    c. positioning a rotary tool against each ball cup, said tools having means for engaging said cups to assist in rotation, and
    d. rotating one of said cups in an opposite direction relative to the other with the assistance of said engaging means, and applying presure thereto whereby the surfaces of said cups are friction-welded to each other along the equator of said ball,
    e. stopping the rotation and relieving the pressure on the cups when the welding temperature is reached and retracting the tools following a brief cooling period.

* * * * *